United States Patent [19]

Kagawa

[11] 4,165,087
[45] Aug. 21, 1979

[54] SNOW-SURFACE DRIVING VEHICLE

[75] Inventor: Kunihiko Kagawa, Tokyo, Japan

[73] Assignee: Mas Co., Ltd., Tokyo, Japan

[21] Appl. No.: 883,676

[22] Filed: Mar. 6, 1978

[30] Foreign Application Priority Data

May 6, 1977 [JP] Japan .................. 52-051889

[51] Int. Cl.[2] ............................................. B62B 13/04
[52] U.S. Cl. ..................................... 280/16; 280/21 A
[58] Field of Search ............... 280/16, 21 R, 17, 21 A

[56] References Cited

U.S. PATENT DOCUMENTS

| | | | |
|---|---|---|---|
| 3,140,099 | 7/1969 | Feu | 280/16 |
| 3,370,862 | 2/1968 | Huffnagle | 280/21 R |
| 3,828,872 | 8/1974 | Tsuchiya | 280/21 R |

FOREIGN PATENT DOCUMENTS

| | | | |
|---|---|---|---|
| 1521562 | 3/1968 | France | 280/16 |
| 452362 | 2/1968 | Switzerland | 280/21 R |

Primary Examiner—Robert R. Song
Attorney, Agent, or Firm—Fleit & Jacobson

[57] ABSTRACT

A snow-surface driving vehicle characterized by being equipped with a pair of skis, left and right, along the longitudinal direction of each of which is mounted a bracket; the left and right ends of a bridging member are supported by means of these brackets; a handle supporting member is attached to the center of the bridging member and the handle supporting member is linked a little ahead of its center by means of a vertical shaft with a connecting member installed in front of the man seating portion; between the connecting member and the brackets, there are control rods mounted by means of universal joints which are attached at points offset from axes of the brackets.

5 Claims, 6 Drawing Figures

SNOW-SURFACE DRIVING VEHICLE

BACKGROUND AND SUMMARY OF THE INVENTION

This invention relates to a snow surface driving vehicle which is able to turn its direction by means of the handle operation. What is aimed at by this invention is to provide a snow surface driving vehicle having such excellent maneuverability that when changing the direction of its ski members, the ski edges can be pushed against the ground in the same way as in the case of riding ordinary skis while at the same time the man seating portion tilts so as to maintain the weight balance at the time of turning.

Another object of this invention is to provide a snow surface driving vehicle to which braking force is applied by raising the fronts of its ski members by pulling backwardly on the handle.

A third object of this invention is to provide a snow surface driving vehicle which is so constructed that braking force is applied in the so-called "Bogen" condition brought about at the inward turning of the front tips of the ski members through the operation of the braking mechanism equipped at the handle.

Figure 1:
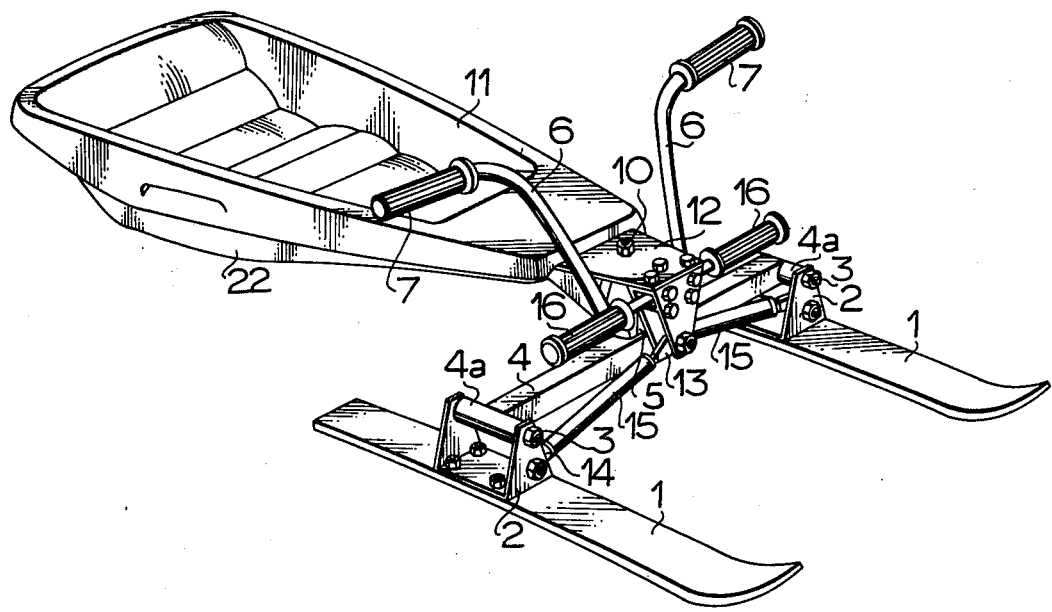
FIG. 1 is a perspective view of the inventive snow vehicle.

The invention will be hereunder explained by way of the embodiments shown in the accompanying drawings. In the embodiments shown in FIG. 1 to FIG. 6, the reference numerals 1 denote a pair of skis, left and right, in the middle of which are installed brackets 2 respectively, and supporting pins 3 provided in said brackets 2 are so fitted to point their respective lines of axes along the longitudinal directions of the skis. To said supporting pins 3 are attached hinge portions 4a being connected with both ends of a bridging member 4 extending left and rightwards. In the middle of said bridging member 4 is fixed a triangular member 5 for supporting handles, and to rods 5a protruding left and right from the above triangular member are connected bar handles 6. To the tips of these bar handles 6 are attached grips 7.

The above handle supporting member 5 has a shaft 8 protruding forward which is connected by a ball-like universal joint 9 located at its tip to a vertical shaft 10. This vertical shaft 10 is attached to a connecting member of trapezoidal shape 12 provided at the front of the seating portion 11.

Between a bracket 12a formed at the front of said connecting member 12 and lower parts of the bearings 2, i.e., lower parts being located apart from the lines of axis of the supporting pins 3 at the bearings, are mounted control rods 15 respectively through the intermediary of universal joints 13 and 14.

In this embodiment, foot supports 16 are attached on both sides of the connecting member 12 and project outwardly from the front tip of the connecting member 12. Against the above connecting member is set a rolling controlling member 18 through threaded shaft 17 extending left and rightward. This roll controlling member 18 is connected with a bolt 20 through the intermediary of a universal joint 19 equipped at its end. The above bolt 20 is placed in a hole which is pierced through the handle supporting member 5 and is fixed by a nut 21. Underneath the seating portion 11 is installed, for instance, a ski having three grooves or sliding edges 22.

Figure 2:
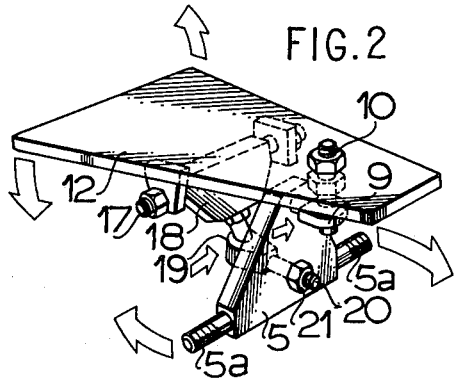
FIG. 2 is a perspective view of the steering mechanism of the embodiment of FIG. 1.
Figure 3:
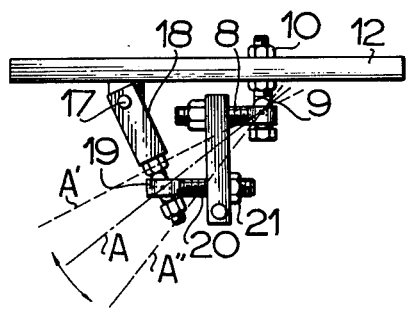
FIG. 3 is a side elevation of the steering mechanism of the embodiment of FIG. 1.
Figure 4:
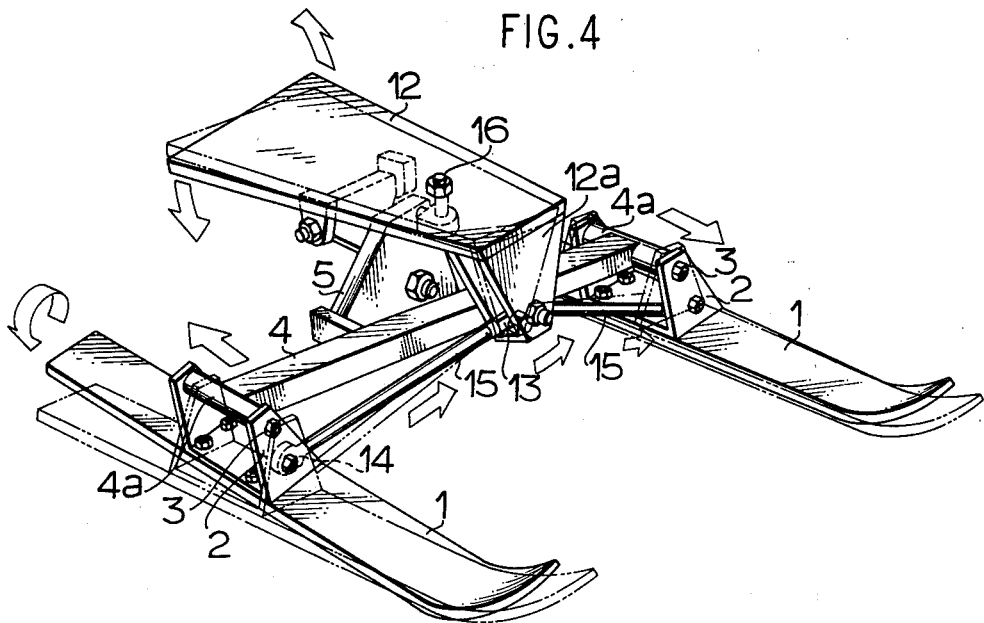
FIG. 4 is a perspective view of the inventive snow vehicle showing the relationship between the steering mechanism and the ski members.

In such a construction, each time the handles 6 are moved reciprocally left and right, the handle supporting member 5 swings left and right, and consequently the bridging member 4 swings left and right. As seen in FIG. 2 the connecting means 18 will then be caused to swing like a pendulum since the universal joint 19 located at the rear of connecting means 5 will move in the direction opposite to the steering direction. This will cause the connecting member 12 to tilt toward the side to which the handles are steered. This also causes the ball joint or universal joint (13 of FIG. 1), which is mounted on bracket 12a affixed to the front of connecting member 12, to move in the direction opposite to the handle steering direction. However, since the control rods 15 are not flexible, the lower parts of the brackets 2 are moved in the direction opposite to the direction of steering, centering around the respective supporting pins. More specifically, the rigid control rod 15 acts through universal joint 14 to draw inwardly the bracket 2 on the side of the direction of steering and the bracket and ski of the opposite side will be pushed outwardly, both brackets moving about pins 5 as axes. Consequently, the edges of the skis 1 on the sides of the steering direction are pushed downward to the ground. Thus, this vehicle can run a curve in the same way as the ordinary skis do. Moreover, inasmuch as the seating portion 11 tilts when the handles 6 are moved through tilting of the connecting member, the weight balance is maintained at the time of turning.

Furthermore, the rising angle of the skis 1 can be determined by moving the handles 6 backward and forward which causes bridging member 4 to revolve around pins 5a.

Figure 5:
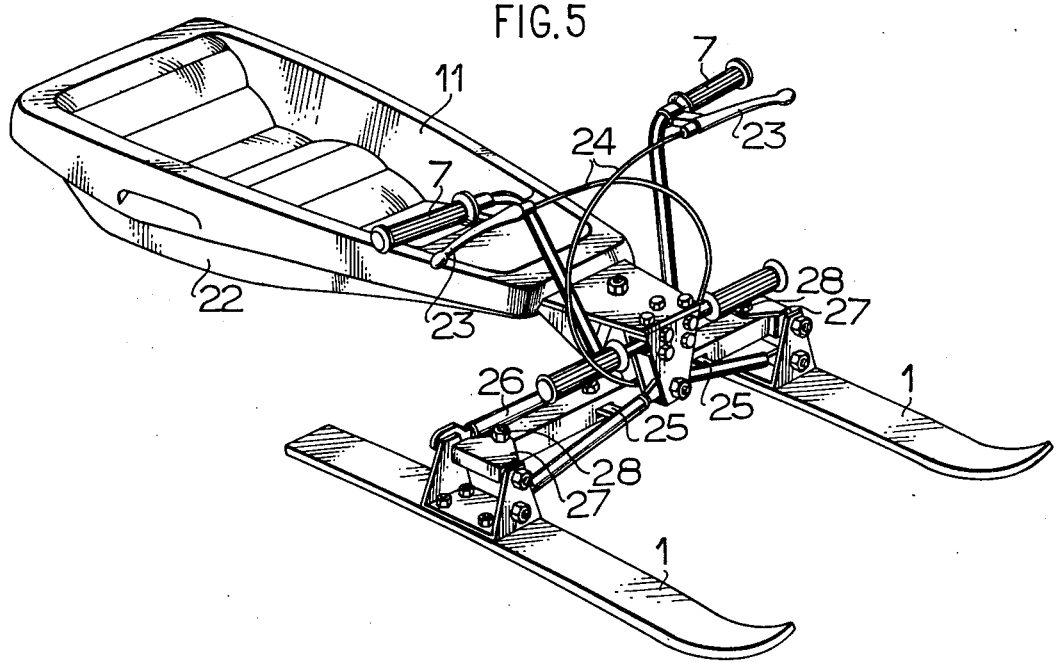
FIG. 5 is a perspective view of another embodiment of the inventive snow vehicle.
Figure 6:
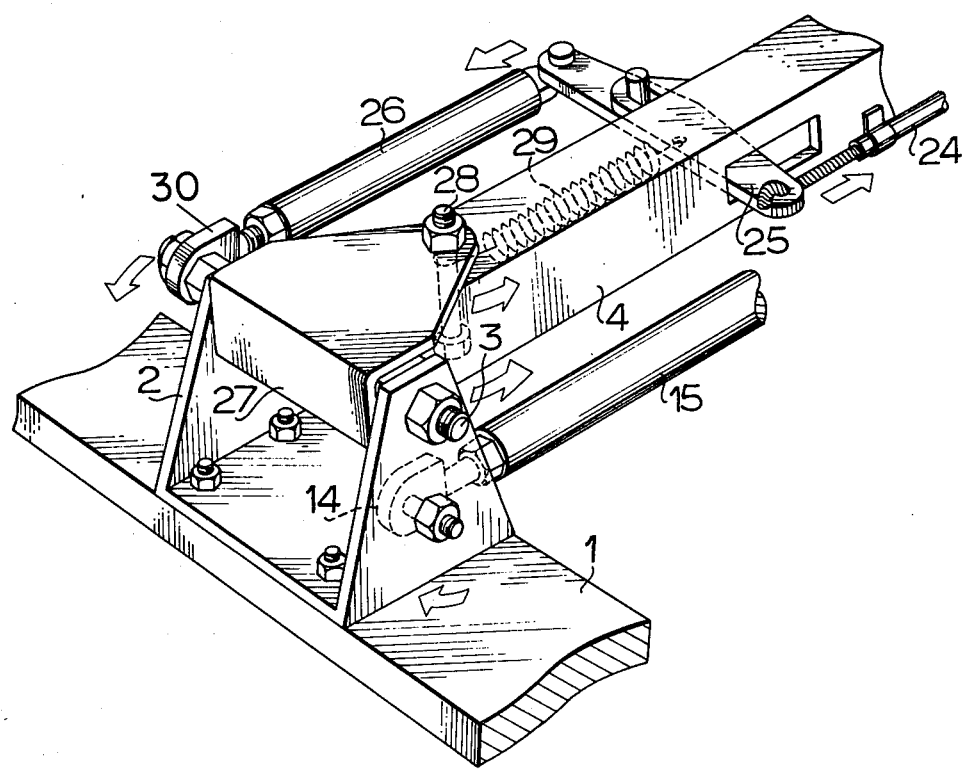
FIG. 6 is a perspective view showing the bracket for mounting the ski members.

In the embodiment shown in FIG. 5 and FIG. 6, control levers 23 are attached to handle grips 7, and they are connected through the intermediary of control wires 24 to the ends of control links 25 pivotally mounted on the bridging member 4. The other ends of control links 25 are connected through the intermediary of link rods 26 to the supporting pins 3. Said bridging member 4 is attached by means of vertical pins 28 to triangular supporting parts 27 which are fixed to the pins 3. Between the pin 28 and the control link 25 is mounted a balancing spring 29 which elastically keeps the control link 25 at a neutral position.

In such a construction, the front tips of the ski members are directed inward by the operation of the control levers 23, and the inside edges of the skis are pushed down to the ground so as to apply brake. This action may be seen in FIGS. 5 and 6, since by operating the control levers 23, the rear ends of the supporting pins 3 will be pushed outwardly by the control links 25, the control rods 26 and the universal joints 30. This will cause the skis 1 to turn about pins 28 and to point inwardly. However, since the lower part of the brackets 2 are located by rigid control rods 15 and universal joints 14, the skis will be caused to tilt outwardly. This results in the inner edges of the skis tilting into the snow in the "Bogen" position. The so-called "Bogen" condition is brought about to apply brake. "Bogen" is a German word meaning bow, curve, arc, arch, etc., and is a well-known skiing term for the stopping maneuver whereby the tips of the skis are pointed inwardly and the inner edges of the skis are caused to bite into the snow. In order to release the brake, the operation of the conrol levers is ceased so that the balancing springs 29 are made to work to have the control links resume the neutral positions and return the skis to their original positions.

In both embodiments mentioned above and as seen in FIG. 3, the line connecting the universal joints 9 and 19 becomes the axis line A of the handle operation. This axis line A becomes A' or A" according to the tightening or the loosening of the nut 21. In the state of A', tilting becomes bigger, and in the state of A", steering range grows bigger.

Thus, according to this invention, when changing the direction of the skis through the operation of the handles, the ski edges are pushed down to the ground in the same way as in the case of ordinary skis, and simultaneously the seating portion tilts so that the weight balance can well be maintained at the time of turning.

Further, by moving the handles back and forth, the rising angle of the skis can be so adjusted to accommodate with the unevenesses of the ground.

Further, by pulling back the handle maximally, the front tips of the skis are raised up so that breaking force can be applied.

Furthermore, the front tips of the skis are directed inward so as to constitute the so-called "Bogen" condition in order that the braking force can be applied.

What is claimed is:

1. A snow-surface driving vehicle characterized in the following; there are equipped a pair of skis, left and right, along the longitudinal direction of each of which is mounted a bracket; the left and right ends of a bridging member arranged between and transverse to said two skis are supported by means of said brackets; a handle supporting member is attached to the center of said bridging member and said handle supporting member is linked a little ahead of its center by means of a vertical shaft with a connecting member installed in front of the man seating portion; a handle is rigidly connected to said handle supporting member, between said connecting member and said brackets, control rods are mounted through the intermediary of universal joints being fixed at spots apart from the lines of axes of the brackets, whereby motion imparted to said handle causes a change in the orientation of said skis.

2. A snow-surface driving vehicle as claimed in claim 1 wherein a supporting member is installed along the longitudinal direction of each of the skis through the intermediary of a bracket; the left and right ends of a bridging member are attached to said supporting members by means of a vertical pin respectively, and a braking mechanism is provided in order that said supporting member is rotated about said vertical pin.

3. A snow-surface driving vehicle as claimed in claim 1 wherein a link mechanism is equipped between said handle supporting member and said connecting member in order that the ranges of forward and backward inclinations of said handle supporting member can be regulated.

4. A snow-surface driving vehicle which is claimed in claim 1 wherein for the purpose of adjusting the steering performance, the forward and backward inclination of the operational axis of the linking mechanism between the bridging member and the connecting member is adjustable.

5. A snow-surface operator controlled driving vehicle characterized by being equipped with a pair of skis, left and right, along the longitudinal direction of each of which is mounted a bracket; the left and right ends of a bridging member arranged between and transverse to said skis are supported by means of said brackets; handles are attached to the center of said bridging member; said bridging member is linked a little behind its handle attaching location by means of a linking mechanism with a connecting member installed in front of the operator seating portion; between said connecting member and said brackets, control rods are mounted through the intermediary of universal joints, and are fixed at spots below the lines of axis of the supporting pins of the brackets; a vertical pin is installed in a supporting member which is attached with said bridging member; and a control mechanism is provided for actuation by said operator which turns said supporting member around said vertical pin and thereby applies braking action to said vehicle.

* * * * *